DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 9, 1971

884 O.G. 434

T884,006

HEAT PROCESSABLE SILVER HALIDE EMULSIONS WITH SOLARIZATION CHARACTERISTICS

George F. L. Wood, Kodak Park, Rochester, N.Y. 14650

Filed July 27, 1970, Ser. No. 58,641
Int. Cl. G03c *1/28, 5/32*
U.S. Cl. 96—108
No Drawing. 10 Pages Specification

There are disclosed radiation-sensitive direct positive gelatino silver halide emulsions in which the silver halide grains have trivalent metal ions such as antimony, bismuth, arsenic, gold, iridium, or rhodium, on the inside thereof. The silver halide grains are formed by adding a trivalent metal ion at an advanced stage of the precipitation, i.e., at a time when grain growth has proceeded to at least about one half of the ultimate average grain diameter. This results in the formation of a grain having the trivalent metal ion closer to the surface of the grain than it would be if the trivalent metal compound had been added at the beginning of the precipitation.

Such emulsions are used in photographic systems having a halogen acceptor contiguous to the trivalent metal containing silver halide grains. This system is exposed to an image, the exposed coating is heated to a high temperature to repress subsequent photodevelopment of the non-exposed areas, and the coating is then photodeveloped, a direct positive silver image resulting due to solarization or reversal of the emulsion.

There is also disclosed in conjunction with such photographic systems the use of positive hole-trapping sensitizing dyes to enhance the solarization effect. Examples of such dyes are 3-carboxymethyl-5-[(2-thiazolidinylidene)-1-methylethylidene]-rhodanine, 3-ethyl-5-[(3-ethyl-2-benzothiazolinylidene)-1-methylethylidene]-2-thio-2,4-oxazolidinedione, and 3-ethyl-5-(1-ethyl-4(H)-pyridylidene)-rhodanine.

The silver halide emulsions and elements described may contain dispersing agents, coating aids, plasticizers, sensitizing dyes, hardeners, and other suitable addenda such as described in U.S. Pat. 3,447,927 of Bacon and Barbier, issued June 3, 1969.